(12) United States Patent
Pieper et al.

(10) Patent No.: US 8,113,113 B2
(45) Date of Patent: Feb. 14, 2012

(54) DISCHARGED BALE CONTROL DEVICE AND CONTROL METHOD

(75) Inventors: Mark Alan Pieper, Ottumwa, IA (US); Henry Dennis Anstey, Ottumwa, IA (US); Jeremy Michael Erdmann, Floris, IA (US)

(73) Assignee: Deere & Company, Moline, IL (US)

( * ) Notice: Subject to any disclaimer, the term of this patent is extended or adjusted under 35 U.S.C. 154(b) by 95 days.

(21) Appl. No.: 12/773,445

(22) Filed: May 4, 2010

(65) Prior Publication Data
US 2011/0271851 A1  Nov. 10, 2011

(51) Int. Cl.
*B30B 5/04* (2006.01)
(52) U.S. Cl. .............................. 100/88; 100/100; 56/341
(58) Field of Classification Search .................... 100/87, 100/88, 89, 100; 56/341; 414/470, 547
See application file for complete search history.

(56) References Cited

U.S. PATENT DOCUMENTS

| | | | | |
|---|---|---|---|---|
| 4,257,219 A * | 3/1981 | Burrough et al. | ............... | 56/341 |
| 4,458,587 A * | 7/1984 | Jennings | ......................... | 100/88 |
| 4,483,247 A * | 11/1984 | Coeffic | ............................ | 100/88 |
| 4,566,380 A * | 1/1986 | Clostermeyer et al. | ......... | 100/89 |
| 4,683,815 A | 8/1987 | Van Ryswyk | | |
| 4,779,527 A | 10/1988 | Ardueser et al. | | |
| 4,889,047 A | 12/1989 | Ardueser et al. | | |
| 5,263,410 A * | 11/1993 | Olin | ............................... | 100/88 |
| 6,073,550 A * | 6/2000 | Goossen et al. | ................ | 100/88 |
| 6,457,295 B1 * | 10/2002 | Arnold | ............................. | 53/211 |
| 6,807,901 B2 * | 10/2004 | Bentzinger et al. | ............. | 100/40 |
| 7,000,533 B2 | 2/2006 | Derscheid et al. | | |
| 7,197,979 B2 | 4/2007 | Derscheid | | |
| 2004/0031402 A1 | 2/2004 | Viaud | | |
| 2004/0221547 A1 | 11/2004 | Anstey et al. | | |

FOREIGN PATENT DOCUMENTS

| | | |
|---|---|---|
| DE | 3247661 | 6/1984 |
| EP | 2100498 | 9/2009 |

OTHER PUBLICATIONS

European Search Report, Aug. 22, 2011, 6 pgs.

* cited by examiner

*Primary Examiner* — Jimmy T Nguyen

(57) ABSTRACT

A baler for making large cylindrical bales is equipped with a device for controlling the placement of a bale after it is discharged. The bale control device is coupled to fixed forward side wall sections of the baling chamber and is selectively operated such that front and rear bale control members of the device are respectively located behind and forward of a space into which a completed bale may be discharged. Thereafter, the bale control members are moved to the rear in to a location wherein the front bale control member holds the discharged bale to the rear of a path traced by the discharge gate when it swings between a raised discharge position and a lowered baling position. The rear bale control member engages a discharged bale so as to halt the rolling inertia imparted to the bale during discharge, the front and rear bale control members thus cooperating for locating the bale at rest. Once the bale is at rest, the rear bale control member is moved to a bale-clearing position wherein the rear bale control member may move forwardly relative to the bale without coming into contact with the bale.

13 Claims, 8 Drawing Sheets

DISCHARGED BALE CONTROL DEVICE
AND CONTROL METHOD

FIELD OF THE INVENTION

The present invention relates to the discharge of bales from large round balers, and more particularly relates to a device for controlling the position of a discharged bale.

BACKGROUND OF THE INVENTION

It has long been a common practice to equip large round balers with ejection devices which include a push-bar to displace the bale clear of a path traveled by the discharge gate as it cycles between closed and open positions when discharging a wrapped bale. Also in common use are various types of ramp designs which carry discharged bales clear of the discharge gate. Examples of a push bar devices are disclosed in U.S. Pat. Nos. 4,779,527 and 4,889,047, while examples of ramp designs are respectively disclosed in U.S. Pat. Nos. 7,000,533 and 7,197,979.

While the above-identified patents disclose devices capable of placing a bale out of the swing path of the bale discharge gate when it is cycling between closed and opened positions, the bales may not stay in a desired location due to momentum imparted to the bale. Such further movement could result in undesired consequences. For example, bales which are wrapped with a protective wrapping, as disclosed in U.S. patent application publication Ser. No. US 2004/0221547, could end up being positioned unfavorably for proper wrapping material functionality. Furthermore, bales which roll excessively after being deposited may result in the unwinding of any wrapped twine or may result in damage to any wrapped plastic material.

The problem to be solved then is that of providing a discharged bale control device which is capable of arresting any rolling of the discharged bale while placing the bale at rest at a location free from the swing path of the discharge gate.

SUMMARY OF THE INVENTION

According to the present invention, there is provided an improved discharged bale control device.

An object of the invention is to provide a discharged bale control device which not only has the ability to control the position of a discharged bale so that it is kept out of the swing path of the bale discharge gate, but also has the ability to place a discharged bale at rest in a predetermined location and orientation.

The stated object is achieved by a discharged bale control device that acts, upon the discharge gate being raised to its open position, to capture the discharged bale between two longitudinally spaced locations and move the bale rearward of the swing path of the discharge gate so as to permit closure of the discharge gate, with the bale control device thereafter being moved so that it does not interfere with the bale as the baler is moved forwardly to resume baling. More specifically, there is provided a bale control arm assembly including opposite fore-and-aft extending side members to which is joined rear and front cross members that, together with the side members, form a rectangular enclosure. During baling, a linkage arrangement connected between the fixed front section of the baling chamber and the enclosure is controlled by an actuator assembly such that the enclosure is held in a retracted, raised, home position, wherein the enclosure is pivoted upwardly about a pivot axis defined between respective forward ends of the bale control arm assembly side members, and the linkage arrangement connecting the control arm assembly to the fixed baling chamber section. When a bale is completed and wrapped within the baling chamber, the actuator assembly is actuated to move the control arm assembly to a lowered, bale-receiving position where it receives the discharged bale between the front and rear bale control members. The linkage arrangement is then extended to the rear so as to cause the control arm assembly to move to an extended bale-controlling position rearward of the swing path of the discharge gate. The discharge gate is then returned to its lowered baling position concurrently with, or followed by the bale control arm assembly being pivoted upwardly to a bale-clearing position. In any event, once the control arm assembly is in its bale-clearing position, baling may be resumed by pulling the baler forwardly. Concurrently with, or shortly after the resumption of baling, the control arm assembly may be retracted to its home position.

The stated object and other objects will become apparent from a reading of the ensuing description together with the appended drawings.

DESCRIPTION OF THE PREFERRED EMBODIMENT

Figure 1:
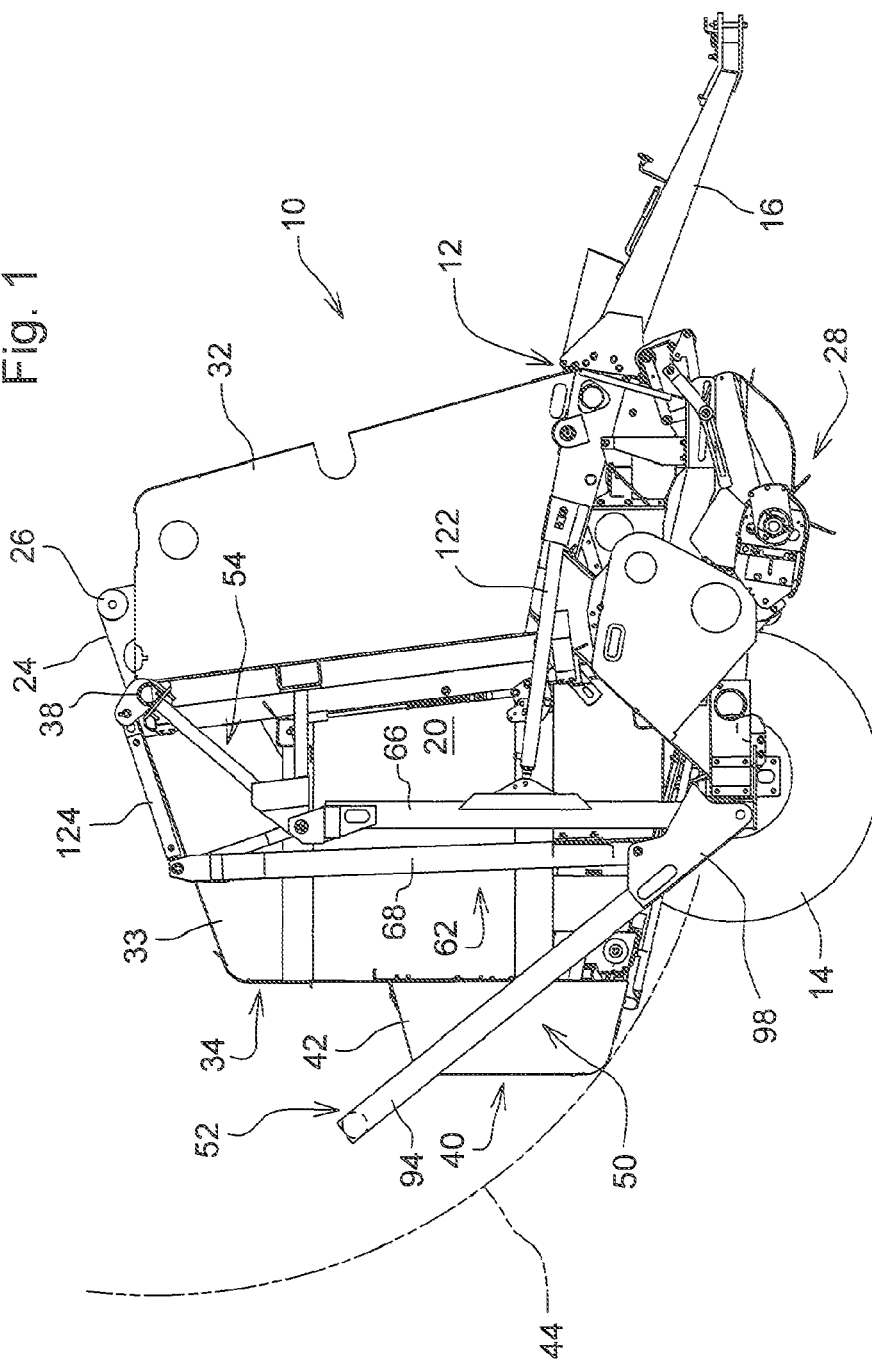
FIG. 1 is a right side view of a large round baler equipped with a discharged bale control device having a bale control arm assembly constructed in accordance with the present invention, with the discharge gate being shown in a lowered baling position and the control arm assembly shown in a retracted, raised home position.

Preliminarily, it is to be noted that the terms "right" and "left" as used herein are determined with reference to an observer standing behind the described structure and facing in the forward direction of travel of the structure.

Referring now to the drawings, there is shown a baler 10 of the type for making large cylindrical bales and commonly called a large round baler. The baler 10 comprises a main frame 12 supported on a pair of ground wheels 14 (only the left wheel being shown for clarity) and including a forwardly projecting draft tongue 16. An expansible bale chamber is defined by opposite side walls 20, of which only the right side wall is shown, and a plurality of belts 24 supported in side-by-side relationship to each other on a plurality of belt-support rolls 26 (see FIGS. 3-5) and belt tensioning and take-up rolls (not shown) arranged, as disclosed in U.S. Pat. No. 4,428,282 for defining an inlet in the bottom of the chamber for receiving crop delivered by a pickup 28 so that it may be rolled by the action of the belts 24 into a completed bale 30, with it being noted that the lead line goes to a bale having a diameter which is that of a maximum sized bale that can be made by the baler 10. Also shown for the purpose of aiding in the description of the present invention appearing below is a medium sized bale 30' and a bale 30" having a diameter approximately 60% that of the largest bale 30 that can be made using the baler 10.

Figure 2:
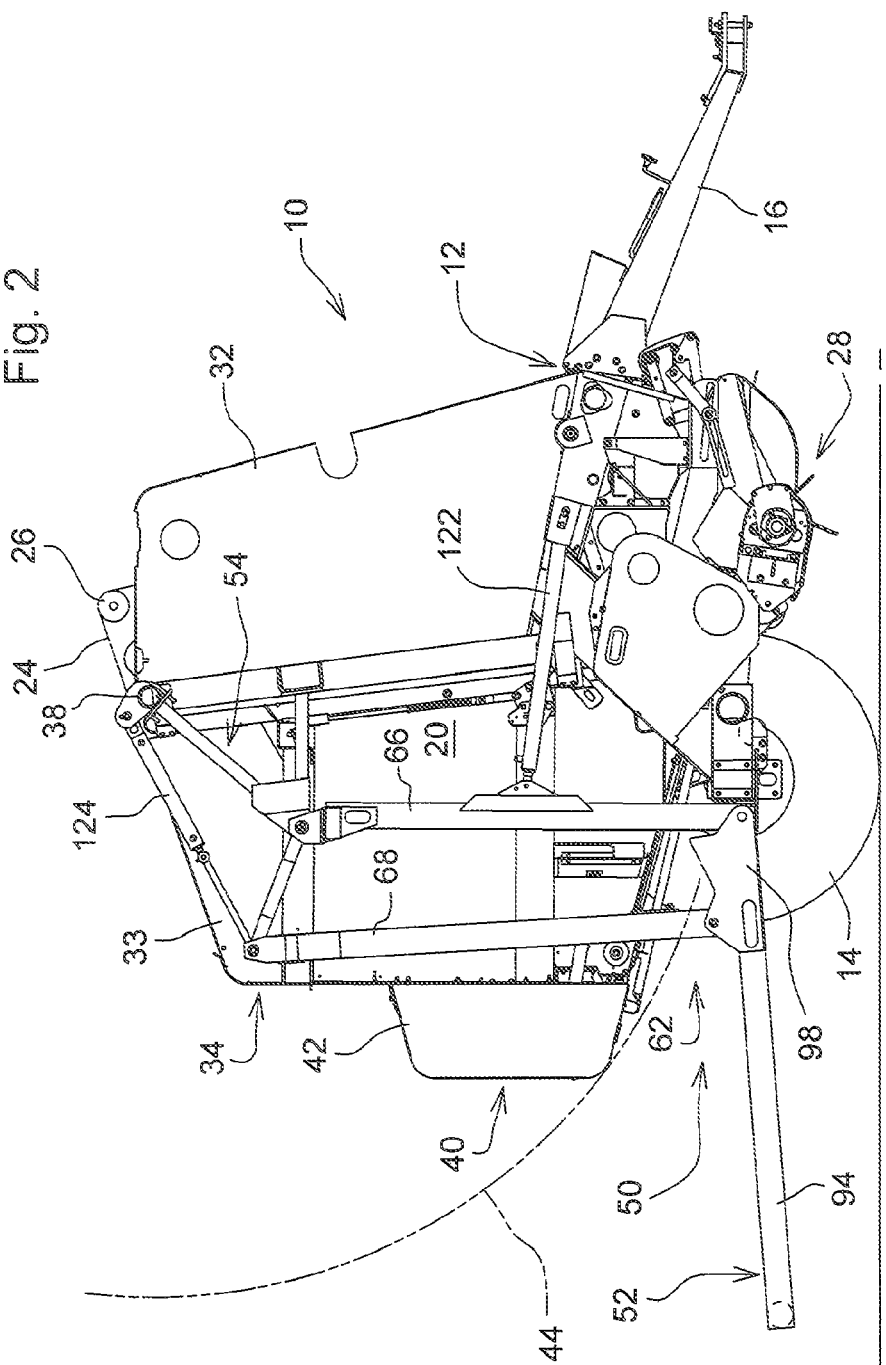
FIG. 2 is a view like FIG. 1, but showing the bale control arm in a retracted lowered bale-receiving position.
Figure 3:
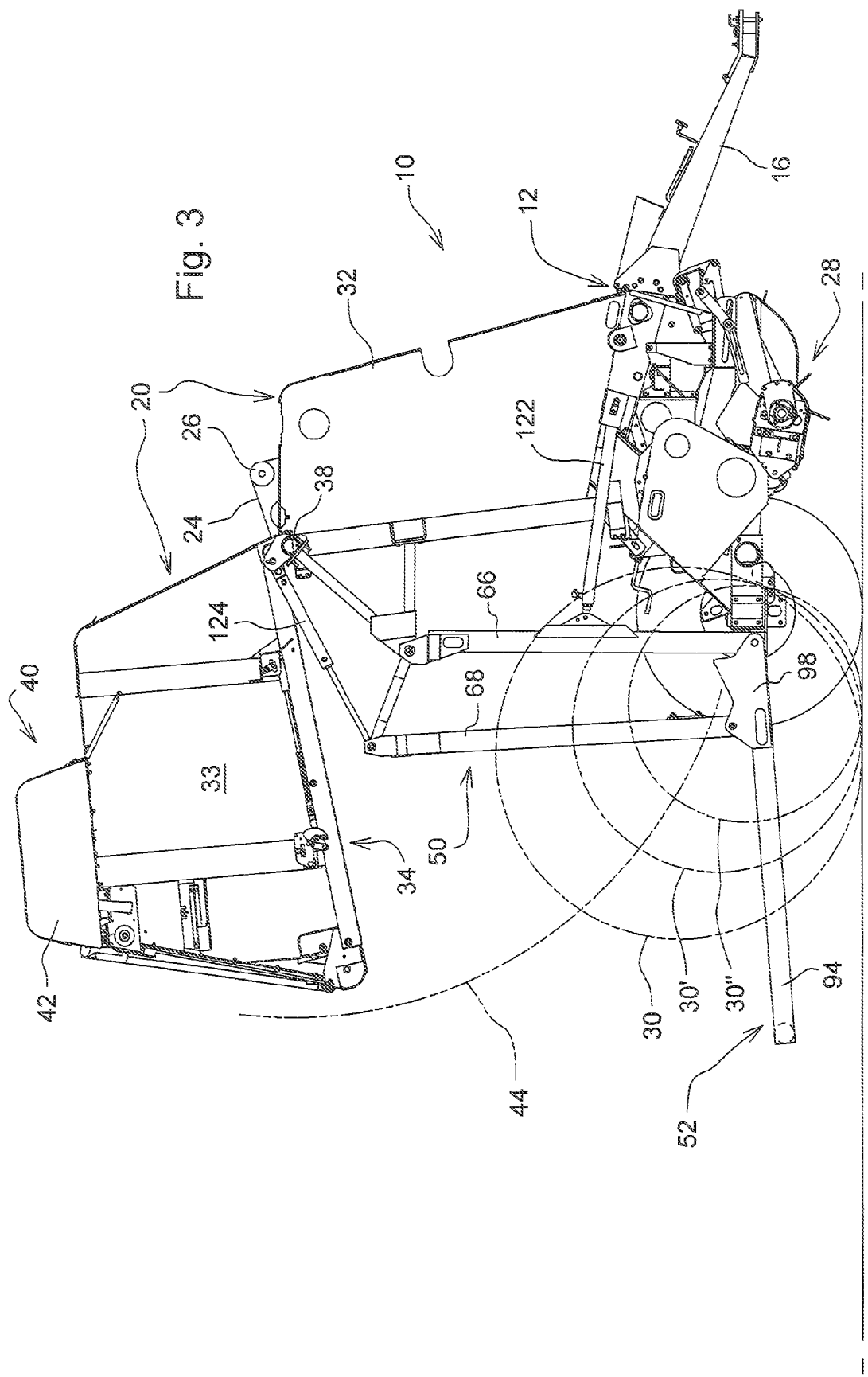
FIG. 3 is a view like FIG. 2, but showing the bale discharge gate in a raised discharge position and with three different sized bales being shown deposited between front and rear cross members of the bale control arm assembly.
Figure 4:
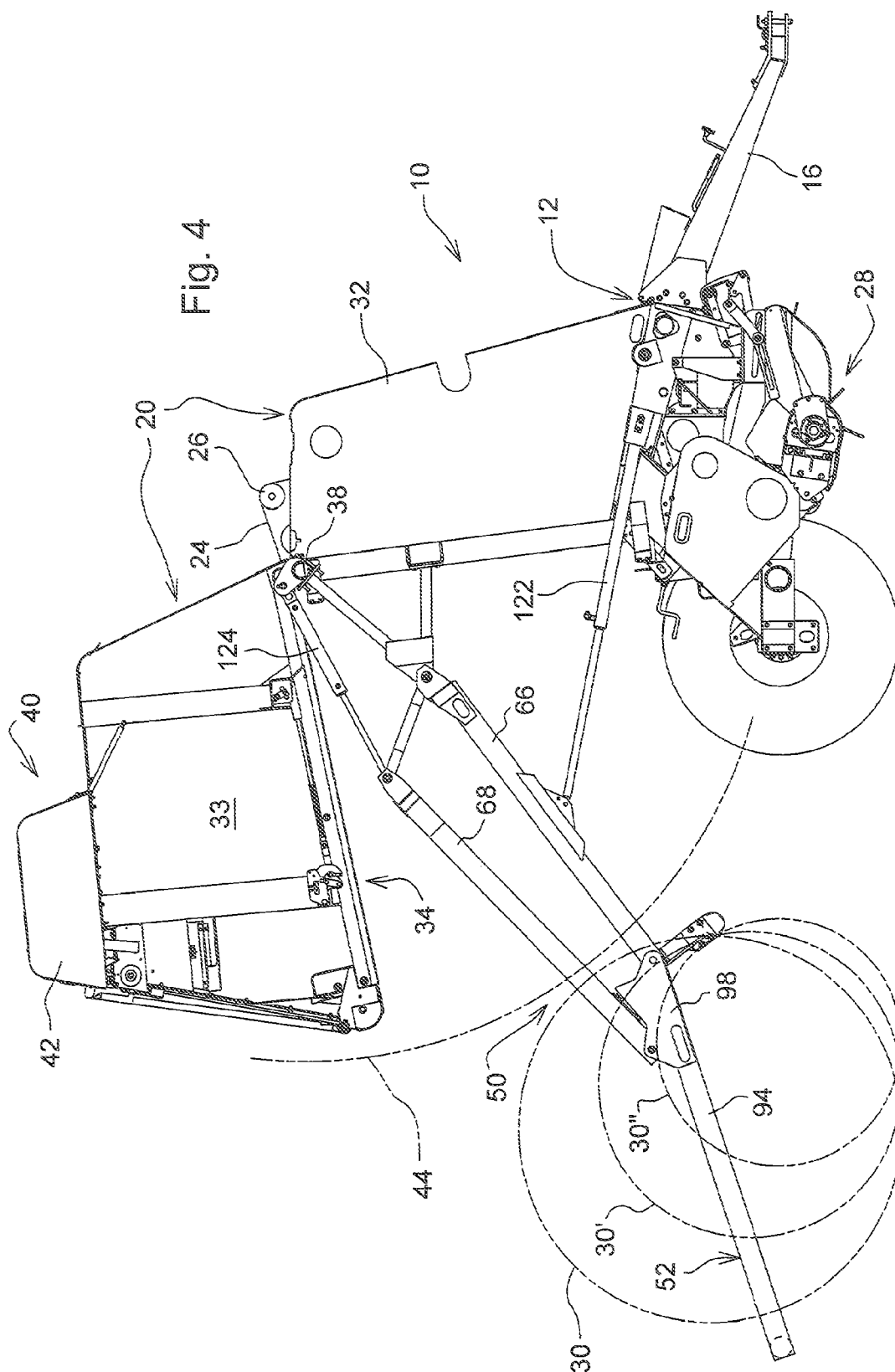
FIG. 4 is a view like FIG. 3, but showing the bale control arm assembly in an extended bale-locating position rearward of a swing path of the bale discharge gate.
Figure 5:
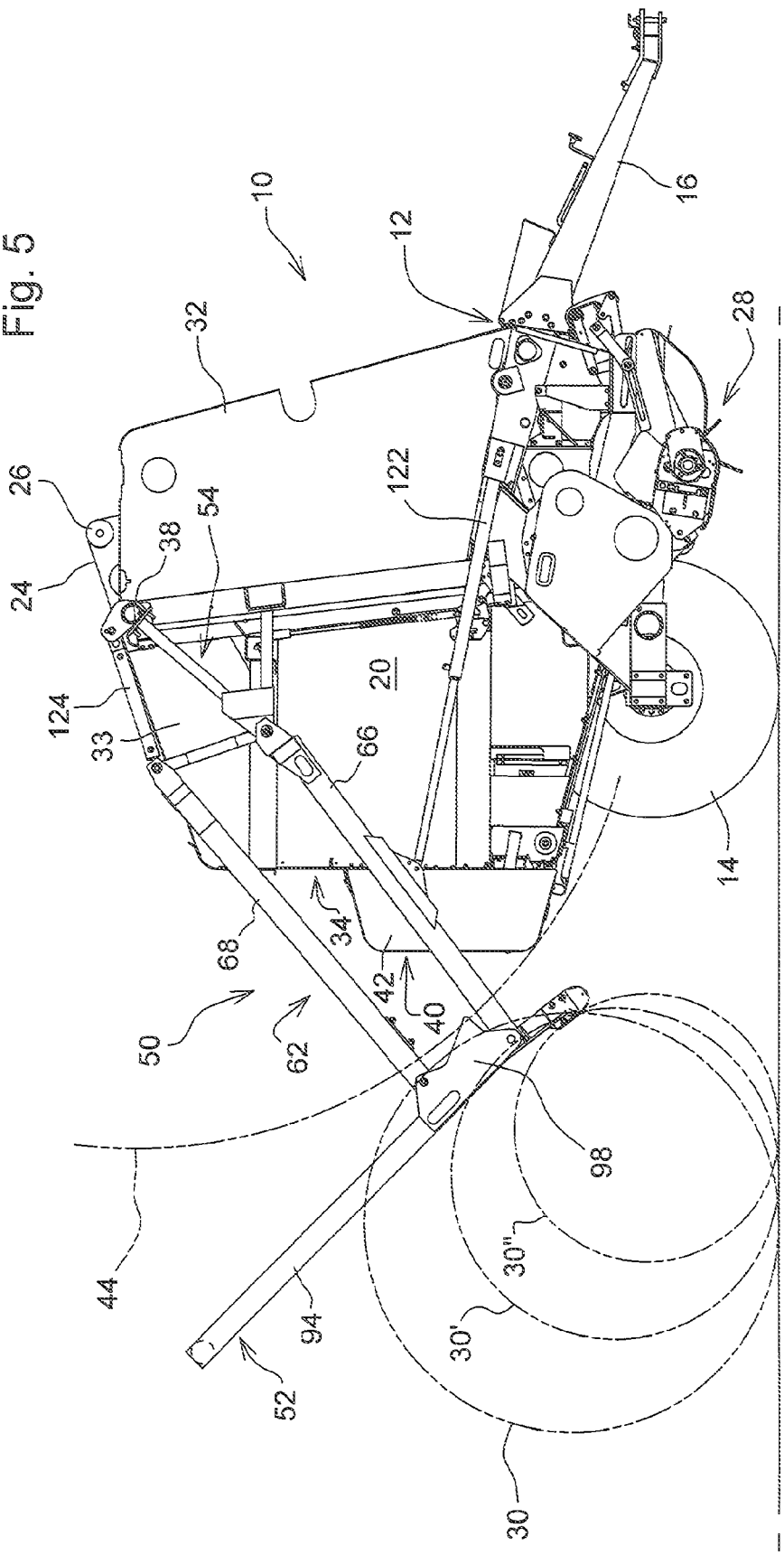
FIG. 5 is a view like FIG. 4, but showing the discharge gate closed and the bale control arm assembly pivoted upwardly to a raised bale-clearing position.

The side walls 20 are composed of a front section 32 forming part of the main frame 12 and a rear section 33 defining part of a discharge gate 34, the sections 32 and 33 meeting at a generally vertical plane when the gate 34 is closed as shown in FIGS. 1, 2 and 5. The gate 34 is mounted to an upper rear location of the front section 32 by a structure 38 forming a transverse pivot axis about which the gate 34 swings vertically to an open discharge position, as shown in FIGS. 3 and 4. Mounted to the rear of the discharge gate 34 is a bale wrapping assembly 40 including a housing 42 having a lower rear corner, which defines a rearmost surface of the baler 10 that is located in a zone that can be contacted by a discharged bale. When the discharge gate 34 is pivoted between closed and open positions, this lower rear corner of the housing 42 traces a swing path 44. A pair of extensible and retractable hydraulic gate actuators (not shown) are connected between the front section 32 and the discharge gate 34 and serve to open and close the gate as desired.

The bale wrapping assembly 40 is selectively operable, in a manner well known in the art, for introducing wrapping material, such as sheet plastic or a plastic net material into the baling chamber for being wrapped about a completed bale within the baling chamber before the bale is discharged onto the ground.

Figure 6:
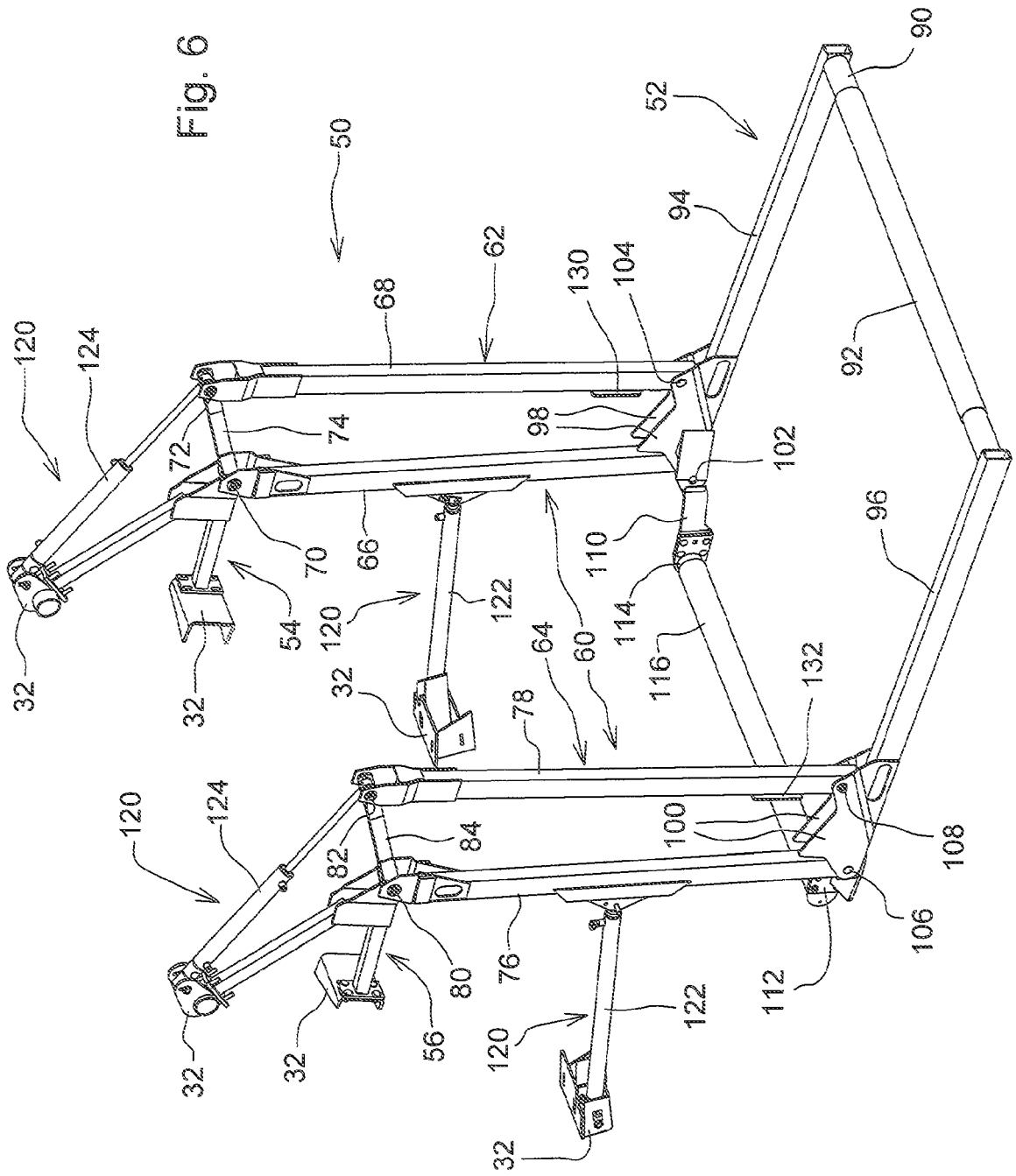
FIG. 6 is an oblique, left side view of the ejected bale control device shown in the position illustrated in the lowered bale-receiving position shown in FIG. 2.

Referring now also to FIG. 6, it can be seen that the present invention resides in a discharged bale control device 50 including a bale control arm assembly 52 suspended from right and left bracket assemblies 54 and 56, respectively, fixed to upper right and left hand regions of the front section 32 of the sidewalls 20. Specifically, the suspension for the control arm assembly 52 includes a linkage arrangement 60 including right and left, substantially parallel linkages 62 and 64, respectively, having upper ends connected to the bracket assemblies 54 and 56, and lower ends respectively coupled to front regions of the bale control arm assembly 52. The right substantially parallel linkage 62 includes upright, spaced front and rear links 66 and 68 having upper ends respectively pivotally connected, as at pins 70 and 72, to front and rear ends of a fore-and-aft extending connecting link 74, with the pin 70 also establishing a pivot connection with the right bracket assembly 54. Similarly, the left substantially parallel linkage 64 includes spaced upright front and rear links 76 and 78 having upper ends respectively pivotally connected, as at pins 80 and 82, to front and rear ends of a fore-and-aft extending connecting link 84, with the pin 80 also establishing a pivotal connection with the left bracket assembly 56.

The bale control arm assembly 52 includes a transverse cylindrical rear bale control member or bar 90 to which a low-friction plastic coating or sleeve 92 is applied, the member 90 having opposite ends respectively fixed to rear ends of fore-and-aft extending, parallel, right and left side members 94 and 96. The front end region of the right side member 94 is received between, and fixed to, a right pair of parallel mounting plates 98, while the front end region of the left side member 96 is received between and fixed to a left pair of parallel mounting plates 100. The lower ends of the front and rear links 66 and 68, respectively of the right substantially parallel linkage 62 are respectively received between and pivotally coupled, as at pins 102 and 104, to lower front and upper rear regions of the right pair of plates 98. Similarly, the lower ends of the front and rear links 76 and 78 of the left linkage 64 are respectively received between and pivotally coupled, as by pins 106 and 108, to lower front and upper rear regions of the left pair of plates 100. Forming an approximate right angle with, and fixed to lower ends of the upright links 66 and 76 are rear ends of right and left straps 110 and 112, respectively, having their front ends respectively fixed to opposite ends of a transverse, cylindrical front bale control member or bar 114 to which a low-friction plastic coating or sleeve 116 is applied. Thus, it will be appreciated that the front and rear bale control members or bars 90 and 114, respectively, together with the side members 94 and 96, mounting plates 98 and 100 and straps 110 and 112 cooperate to define a generally rectangular enclosure, with the distance between the front and rear bars 90 and 114 being at least equal to, but preferably slightly greater than that of a diameter of the largest bale 30 that can be formed by the baler 10.

An actuator assembly 120 is provided for effecting selected movements of the linkage arrangement 60 so as to cycle the bale control arm assembly 52 among various positions, illustrated in FIGS. 1-5, during controlling a discharged bale. Specifically, the actuator assembly 120 includes a pair of extensible and retractable drive cylinders 122 connected between opposite sides of the front sections 32 of the baler side walls and middle locations of the front upright links 66 and 76. The actuator assembly 120 further includes a pair of extensible and retractable hydraulic lift cylinders 124 respectively having first ends connected to the front sidewall sections 32 at locations adjacent upper ends of the brackets 54 and 56, and second ends respectively coupled to upper ends of the rear upright links 68 and 78.

In operation, assuming the bale discharge gate 34 to be in its lowered baling position, and the discharged bale control arm assembly 52 to be in its retracted, raised home position shown in FIG. 1, the baler 10 will be advanced along a windrow of crop while the pick-up 28 elevates the crop into the baling chamber inlet for being rolled into a compact cylindrical bale by the bale-forming belts 24.

Once a bale 30 (see FIG. 3) or any other desired size of bale, is completed, a wrapping action is initiated and the wrapping assembly 40 operates to introduce a length of wrapping material into the baling chamber where it becomes wrapped upon the surface of the completed bale. During the wrapping operation, the lift cylinders 124 are actuated to cause them to extend, thereby effecting downward pivoting of the connecting links 74 and 84, with this motion being transferred to the bale control arm assembly 52 by the rear upright links 68 and 78, thereby causing the arm assembly 52 to assume a bale-receiving position, as shown in FIG. 2, wherein the front and rear bale control bars 114 and 90 are approximately in the same horizontal plane.

The wrapped bale 30 is then discharged by extending the gate control cylinders (not shown) so as to cause the discharge gate 34 to be pivoted upwardly, from its closed position shown in FIG. 1 to its open position shown in FIG. 3. The bale 30 then falls from the baling chamber into the space between the rear and front bale control bars 90 and 114 of the bale control arm assembly 52, noting that the rear bale control bar 90 will act to arrest any rearward rolling movement of the bale 30 which may result during discharge due to kinetic energy being imparted to the bale. Once the bale 30 is located on the ground between the bale control members 90 and 114, the drive cylinders 122 are extended to cause the right and left substantially parallel linkages to swing to the rear so as to place the control arm assembly 52 in a rearwardly extended, bale-locating position, the rearward movement of the arm assembly 52 resulting in the front bale control member 114 to engaging and rolling the bale 30 rearward past the discharge gate swing path 44. In the event that the bale 30 continues to roll once rearward movement of the control arm assembly 52 stops, the bale control member 90 will stop the bale 30, if necessary. It is to be noted that the L-shaped configuration defined by the front links 66 and 76, and the straps 110 and 112 is such that the front bale control member 114 moves so that it maintains a height above the ground that is low enough for engaging and moving a bale 30" which has a diameter that is approximately 60% of the largest diameter that can be produced by the baler 10. Further, it is to be noted that when in this bale-locating position, the U-shaped structure defined by the rear bale control bar 90 and side members 94 and 96 will be prevented from moving over center relative to a transverse pivot axis defined by the pivot pins 104 and 108 by right and left stop plates 130 and 132, respectively carried by the rear upright links 68 and 78, which come into contact with upper surfaces of the middle portions of the pairs of mounting plates 98 and 100.

Once the bale 30 is moved to the rear of the discharge gate swing path 44 and at rest, the gate control actuators are retracted thereby lowering the discharge gate 34 to its closed baling position, shown in FIG. 5. Concurrently, the lift cylinders 124 are contracted thereby raising the rear bale control member 90 to a bale-clearing position wherein the member 90 is at a height sufficient to clear the bale 30.

Once the rear bale control member 90 is positioned for clearing the bale 30, the tractor, or the like, towing the baler 10 is driven forwardly and operated for picking up crop from a windrow for forming a new bale as the drive cylinders 122 are retracted, thereby returning the control arm assembly 52 to the home position, shown in FIG. 1.

Figure 7:
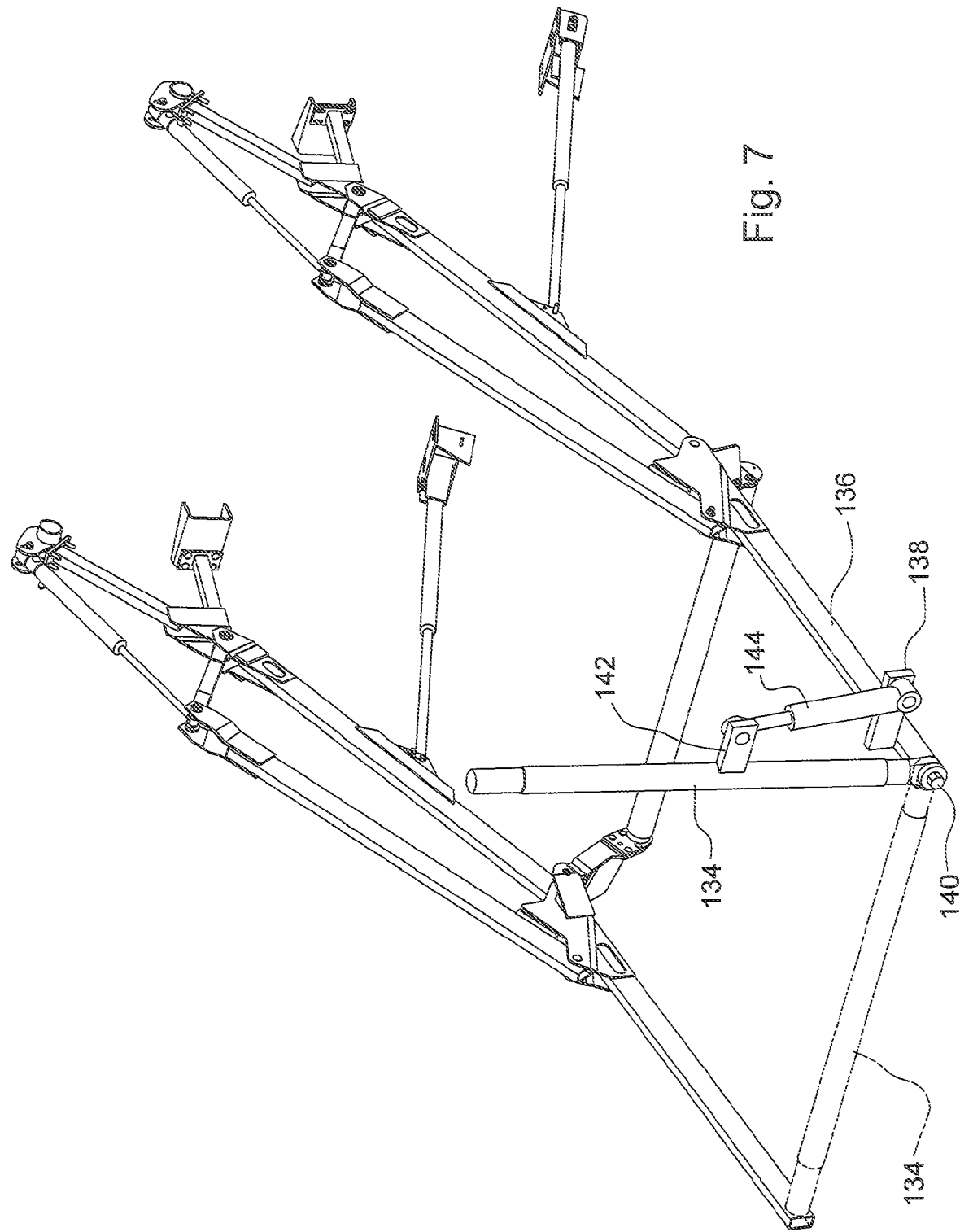
FIG. 7 is right rear perspective view of the baler and discharged bale control device illustrating an alternate embodiment of the manner of mounting the rear bale control member, showing the bale control device in a mode of operation similar to that illustrated in FIG. 4.
Figure 8:
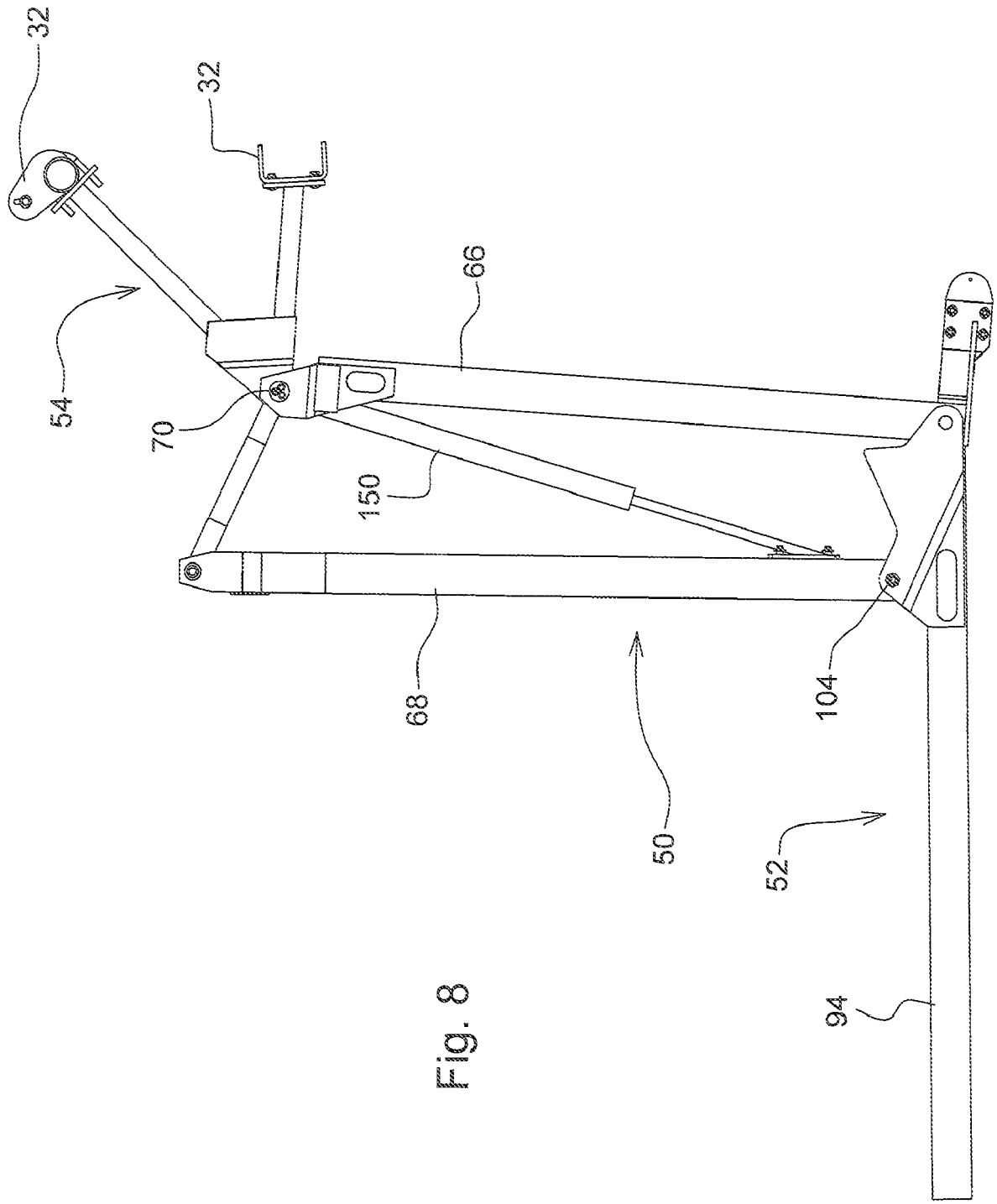
FIG. 8 is a right side view of the discharged bale control device shown in a bale-receiving position, like the device shown in FIG. 3, but illustrating an alternate embodiment of the manner in which the positioning of the front and rear bale control members is controlled by a pair of hydraulic cylinders respectively mounted diagonally within the pair of parallel linkages at the opposite sides of the baler.

FIGS. 7 and 8 respectively show first and second alternate embodiments of the discharged bale control device 50 wherein those structural components which are identical to those described in FIGS. 1-6 are designated with identical reference numerals.

Referring to FIG. 7, the first alternate embodiment differs from that of the previously described embodiment only in that the bale control arm assembly 52 is modified by replacing the rear bale control member 90 with a rear bale control member 134, and by replacing the right side member 94 with a right side member 136. The right side member 136 differs from the right side member 94 in having its rear end region provided with a mounting bar 138 that is joined to, and makes a right angle with, a remaining, fore-and-aft extending portion of the side member 136. The rear bale control member 134 is mounted for pivoting vertically about a fore-and-aft axis defined by a coupling pin 140 mounted to a rear end of, and being axially aligned with, the side member 136, the pin extending through an end region of the rear bale control member 134. Mounted between the mounting bar 138 and a bracket 142 provided on the rear bale control member 134 is an extensible and retractable hydraulic actuator 144, shown in a retracted condition wherein it holds the rear bale control member 136 in an upwardly projecting, bale-clearing position that is outward of the right end of the discharged bale 30 so as to permit the parallel linkages 62 and 64 to be retracted to the position shown in FIG. 3 by retracting the actuators 122, and/or the baler 10 to be moved forwardly, without the rear bale control member 134 interfering with the bale 30. The control arm actuator 144 may then be extended to return the control arm 136 to its normal horizontal position shown in dashed lines and the arm assembly 52 returned to a home position by retracting the lift cylinders 124, this position corresponding to that illustrated in FIG. 1 of the previously described embodiment. Obviously, instead of being mounted to the right side member of the control arm assembly 52, the rear bale control member 134 could just as well be mounted to the left side member.

The operating condition of the baler 10 and discharged bale control device 50 shown in FIG. 7 corresponds to that of the previously described embodiment shown in FIG. 5. Specifically; like in FIG. 5, the control arm assembly 52 is extended to the rear by the extended drive cylinders 122, with the discharged bale 30 being placed at rest behind the swing path 44 of the discharge gate 34, with the gate 34 being returned to its lowered baling position. The rear bale control member 134 is pivoted to a bale-clearing position, which is also true of the bale rear bale control member 90, the difference being that the bale control member 134 is pivoted about the fore-and-aft axis of the connecting pin 140 into a vertical bale-clearing position so as to pass outward of the bale when the extended drive cylinders 122 are retracted, and/or the baler 10 is moved forward, while the bale control member 90 is swung upwardly with the side arms 94 and 96 to the horizontal bale-clearing position spaced above the ground by a distance greater than the diameter of the bale 30.

Referring now to FIG. 8, the second alternate embodiment of the discharged bale control device 50 differs from that of the first described embodiment only in that the pair of drive cylinders 122 and the pair of lift cylinders 124 are replaced by a pair of hydraulic cylinders 150 respectively coupled diagonally between the pivot pins 70 and 104 of the right substantially parallel linkage 62, and diagonally between the pivot pins 80 and 108 of the left substantially parallel linkage 64, with only the right linkage 62 and cylinder 150 being visible. As illustrated in FIG. 8, the bale control device 50 is in a bale-receiving position, corresponding to that shown in FIG. 2, the cylinders 150 then being in partially extended. By fully extending the cylinders 150, the linkages 62 and 64 swing to the rear to the bale-placing position shown in FIG. 4, wherein the discharged bale 30 is at rest behind the swing path 44 followed by the lower rear corner of the wrap mechanism housing 42 as the discharge gate 34 pivots to the raised discharge position shown in FIG. 4. Then, by contracting the cylinders 150 part way, the control arm assembly 52 will pivot upwardly about its front end so that the rear bale control member 90 is in an elevated bale-clearing position corresponding to the position shown in FIG. 5, permitting the bale control member 90 to move forwardly over the bale 30 either by further contraction of the cylinders 150 for placing the arm assembly in a home position corresponding to that shown in FIG. 1, and/or by moving the baler 10 forwardly. It will be appreciated that the same movements of the parallel linkages 62 and 64 described above could be achieved by mounting cylinders diagonally between the remaining two pivots of the linkages, with the cylinders then being contracted and extended, respectively, to achieve those movements caused by extension and contraction of the cylinders 150.

It will be appreciated that various alternate design possibilities exist for moving the bale control bars or members 90 and 114 among their home and various working positions. For example, either one or both of the pairs of cylinders 122 and 124 can be replaced by drive elements coupled between the discharge gate 34 and the parallel linkages 62 and 64 (see the discharge gate-powered drive elements disclosed in U.S. Pat. No. 4,889,047). Another example would be to mount the lift cylinders 124 between the parallel linkages 62 and 64 and the bale control arm side members 94 and 96. Another alternative would be to suspend the front and rear bale control members 114 and 90 for being operated independently of one another.

Still another possible variant in the bale control device 50 could be that of constructing the bale control arm assembly 52 so the space between the bale control members 90 and 114 is adjustable for accommodating different sized bales. This could be accomplished by making the side members 94 and 96 telescopic, with adjustments being accomplished either manually or with some sort of mechanical power, such as hydraulic cylinders or motor-driven screws, for example.

Having described the preferred embodiment, it will become apparent that various modifications can be made without departing from the scope of the invention as defined in the accompanying claims.

The invention claimed is:

1. In combination with a baler for making large cylindrical bales and including a mobile main frame, a baling chamber including a fixed forward section having opposite sidewalls forming part of said main frame, and a movable rear section defining a discharge gate mounted to an upper rear location of said forward section for pivoting about a transverse axis between a closed baling position and a raised discharge position, with a rearmost surface carried by said discharge gate thereby tracing a swing path, a discharged bale control device, comprising: a bale control arm assembly mounted to said main frame and including transversely extending front and rear bale control members mounted for movement among various operating positions including a home position, wherein said front and rear bale control members are located adjacent the closed discharge gate, a bale-receiving position, wherein said front and rear bale control members are disposed in a plane extending beneath said swing path and defining a space between them for directly receiving a bale discharged onto the ground, a bale-locating position, wherein said front bale control member is shifted to the rear a distance for locating the discharged bale rearward of said swing path, with the front and rear bale control members acting for causing the bale to come to a complete stop despite rolling inertia being imparted to the bale during discharge, and a resume-baling position, wherein said rear bale control member is moved to a bale-clearing position relative to the discharged bale permitting forward movement of said rear bale control member without contacting the discharged bale; and an actuator assembly being coupled for selectively moving said front and rear bale control members among said various operating positions.

2. The combination, as defined in claim 1, wherein said space between said front and rear bale control members is dimensioned to exceed a diameter of a bale to be discharged into said space by only a small amount, thereby minimizing unwanted fore-and-aft movement of said bale within said space after discharge.

3. The combination, as defined in claim 1, wherein said front and rear bale control members are so located relative to a discharged bale received in said space that they cooperate to stop any rolling inertia imparted to the bale during discharge and to locate the bale at rest when in said bale-locating position.

4. The combination, as defined in claim 1, wherein said bale control arm assembly is mounted to the main frame by a control linkage arrangement connected between said fixed forward section of said baling chamber and said control arm assembly; and said actuator assembly being connected to said linkage arrangement.

5. The combination, as defined in claim 4, wherein said bale control arm assembly defines a generally rectangular enclosure, with said front and rear bale control members being front and rear sides of said enclosure and with said space being located within said enclosure.

6. The combination, as defined in claim 5, wherein opposite sides of said rectangular enclosure are respectively defined by fore-and-aft extending right and left side members; said rear bale control member having one end pivotally mounted to a rear end region of one of said right and left side members for swinging upwardly about a fore-and-aft extending axis between a horizontal position, wherein said rear bale control member together with said front bale control member establish said bale-receiving and bale-locating positions, to an upright position defining said bale-clearing position, once a discharged bale is located at rest; and said actuator assembly including an actuator coupled for moving said rear bale control member between said horizontal and upright positions.

7. The combination, as defined in claim 4, wherein said bale control arm assembly is mounted to said opposite side walls of said forward section of said baling chamber; said control linkage arrangement including first and second, generally parallel linkages respectively mounted between upper rear locations of opposite sides of said forward fixed chamber section and opposite sides of said bale control arm arrangement.

8. The combination, as defined in claim 7, wherein said actuator arrangement includes a pair of extensible and retractable drive cylinders respectively coupled between opposite sides of said fixed front chamber section and said first and second parallel linkage arrangements and being operable for moving said front and rear bale control members in unison between said bale-receiving position, and said bale-locating position.

9. The combination, as defined in claim 7 wherein said actuator assembly includes a pair of extensible and retractable operating cylinders, mounted one each so as to extend diagonally between pivot pins at opposite corners of said first parallel linkage arrangement, and so as to extend diagonally between pivot pins at opposite corners of said second parallel linkage arrangement.

10. The combination, as defined in claim 7, wherein said first and second, generally parallel linkages each include a front upright link; and said front bale control member being fixed to the lower ends of said front upright links of said first and second generally parallel linkages.

11. The combination, as defined in claim 10, wherein said front bale control member is fixed to said front upright links by a pair of straps having rear ends respectively fixed to said front upright links, and front ends respectively fixed to opposite ends of said front bale control member.

12. The combination, as defined in claim 11, wherein said straps are oriented approximately 90° to said front upright links.

13. The combination, as defined in claim 7, wherein said first and second generally parallel linkages each include first and second pairs of front and rear upright links, said first and second pairs of front and rear upright links each having upper ends pivotally coupled to front and rear ends of a fore-and-aft extending link, and each having bottom ends respectively pivotally connected to a front end region of said bale control arm assembly; and said actuator arrangement including a pair of extensible and retractable lift cylinders respectively coupled between opposite sides of said fixed front chamber section and upper ends of said rear upright links, such that retraction of said lift cylinders results in said bale control arm assembly being pivoted upwardly about the pivotal connections defined between the bottom ends of said front upright links and the front regions of said bale control arm assembly.

* * * * *